July 15, 1941.     L. G. COPEMAN     2,248,963
CONTAINER FOR CONFECTIONS
Filed May 18, 1937     2 Sheets-Sheet 1

INVENTOR.
Lloyd G. Copeman
BY
Barnes, Kisselle, Laughlin & Rauch
ATTORNEYS

July 15, 1941.   L. G. COPEMAN   2,248,963
CONTAINER FOR CONFECTIONS
Filed May 18, 1937   2 Sheets-Sheet 2

INVENTOR.
Lloyd G. Copeman
BY
Barnes, Kisselle, Laughlin & Raisch
ATTORNEYS.

Patented July 15, 1941

2,248,963

UNITED STATES PATENT OFFICE 2,248,963

CONTAINER FOR CONFECTIONS

Lloyd G. Copeman, Flint, Mich., assignor to Copeman Laboratories Company, Flint, Mich., a corporation of Michigan Application May 18, 1937, Serial No. 143,249

5 Claims. (Cl. 99—180)

This invention relates to a container for confections, frozen and otherwise, and the combination therewith of elastic containers in which they are dispensed to the consumer and from which they may be eaten.

An object of this invention is to provide a flexible container for frozen confections and other solid confections and formed of such material as to permit the consumer to free the confection for gradual consumption without inconvenience and which will result in a sanitary means for handling the confection while it is being consumed.

An important object of this invention is to provide a container for frozen substances made of a flexible resilient material which is not readily wettable by water and to which ice and other frozen substances does not readily adhere, said container having a small orifice which may be readily stretched and slipped over the frozen confection and then later peeled back from one end of the frozen confection as it is being eaten.

Another object of the invention is to provide a container in the shape of a double balloon joined together by a neck portion, one of said balloon portions being telescoped within the other to form a single double walled container with a convenient dispensing orifice, said double wall serving also as an insulator for any frozen substance contained therein.

A feature of this invention is that the elastic container itself may serve as the mold in which an initially liquid or semi-solid confection may be frozen or congealed, and thus frozen units of various shapes and representations may be easily and economically provided without the necessity of providing correspondingly shaped molds for freezing said units and later removing the units from the freezing molds and then applying wrappings or containers in which the frozen units are dispensed. Furthermore, due to the fact that the containers are made of rubber which does not readily adhere to frozen substances, they may be easily peeled therefrom as the confection is consumed.

The containers may also be used as lining for molds in which a frozen substance is to be formed in varying shapes, such as in the form of fruit, or animals. When removed from the mold the containers are of such nature that they may be packed for shipment and will not freeze or stick together when subjected to the temperature necessary for transferring the frozen confections from one point to another.

The container is not necessarily to be confined to dispensing frozen substances but may be especially convenient as a container for small candies or nuts which would be easily dispensed into the hand through the small orifice.

Various modifications of the invention are disclosed in the following description and accompanying drawings.

Figure 1:
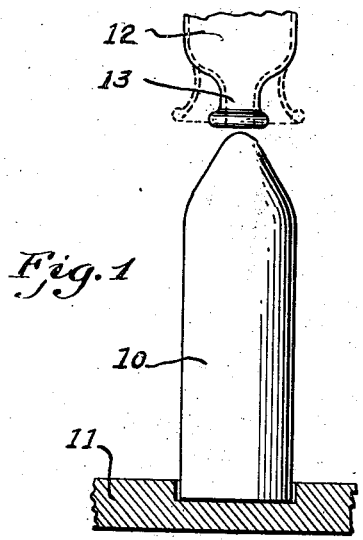
Figs. 1 and 2 represent a method of slipping an elastic container over a separately frozen pointed block of confection.
Figure 2:
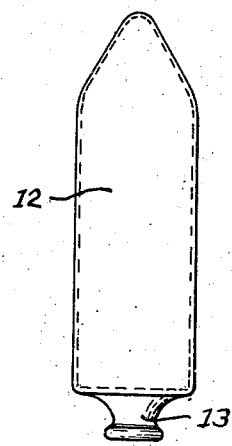

Referring to Fig. 1 a pointed frozen block of confection 10 is shown supported on a rack 11. A flexible rubber container 12 is shown in solid lines in its normal form with a neck portion 13. The dotted lines show the neck portion 13 in a stretched position whereby the container may be pulled over the confection 10, and the neck portion 13 again retracted to normal state as shown in Fig. 2. When it is desired to free the frozen confection 10 from the container 12 the neck portion 13 may again be stretched and peeled back from the confection, due to the fact that the container is formed from flexible rubber and does not adhere to the frozen substance. The relative lengths of the block 10 and the balloon container 12 should be such that when the block 10 is fully inserted the neck 13 will close in, as illustrated in Fig. 2, and so provide a substantial end closure.

Figure 3:
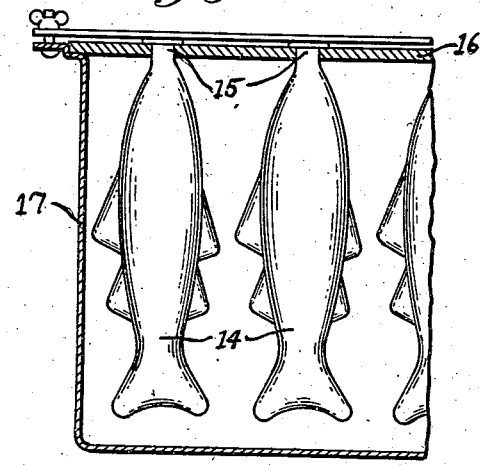
Fig. 3 illustrates the container when used as a mold for initially liquid or semi-solid materials which are later frozen by a freezing solution in the tank in which the molds are suspended.

In Fig. 3 the fish-shaped molds 14 shown with a neck portion 15 which serves to suspend the molds from a frame 16 on a tank 17. The tank 17 is adapted to contain a freezing solution and would serve to freeze solidly any liquid or semi-solid confection which was contained in the molds 14. The containers 14 would be freed from the frozen confection in the same manner as described with reference to Fig. 2, namely by peeling back the neck portion 15 from the frozen confection contained therein.

Figure 4:
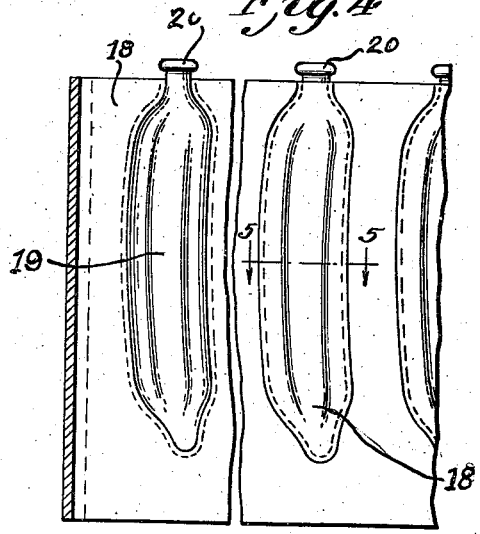
Fig. 4 shows the container as a lining in individual molds.

In Fig. 4 is illustrated a metal mold 18 formed in the shape of a banana and for which the flexible rubber container 19 serves as a lining. The container is provided with a neck portion 20 which serves to release the frozen confection within the container as previously described with reference to Figs. 2 and 3.

Figure 5:
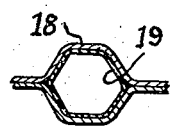
Fig. 5 is a cross-section taken on the line 5—5 of Fig. 4.
Figure 6:
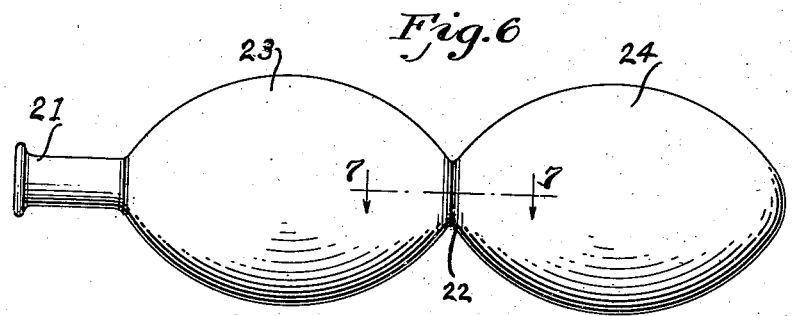
Fig. 6 illustrates a double balloon container.
Figure 8:
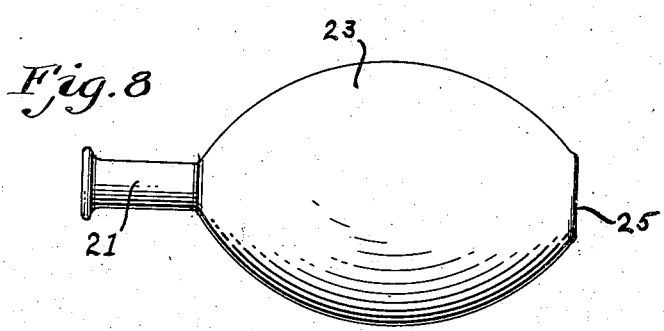
Fig. 8 represents the balloon telescoped upon itself to form a double wall container.

Fig. 5 shows the cross-section of the assembled mold and the relationship of the rubber container as a lining therein. When the balloon shaped containers 19 are filled with liquid confection through the exposed openings 20 the weight of the liquid causes the cylindrical balloon to fill out and take the shape of the mold cavity 18, as shown clearly in Fig. 5. After the contents are frozen hard the molds are separated to remove the frozen contents, and thereafter the frozen contents will cause the balloon to remain in the molded shape such as the shape of the banana shown. The metal mold plates 18 are preferably formed of flat sheet metal having good heat conducting properties as, for example, copper, and the freezing is preferably done by circulating cold brine over the lower portion of the mold plates 18.

Figure 9:
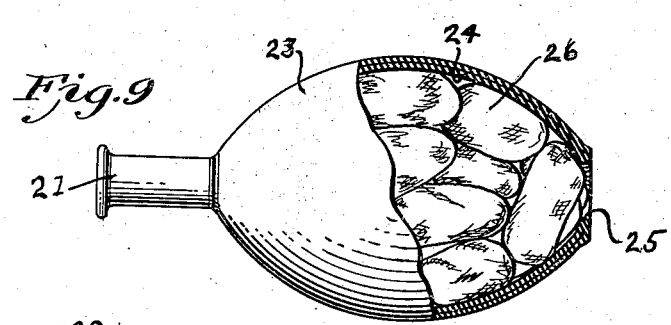
Fig. 9 shows the cross-section of a portion of the said container and illustrates the method in which confections would be contained therein.
Figure 7:
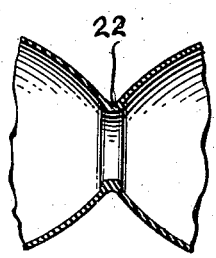
Fig. 7 shows a cross-section of the neck of the double balloon container and illustrates the reinforced portion thereof.

In the modifications illustrated in Figs. 6 to 9, the container is formed in the shape of a double balloon which comprises an opening neck 21 and a connecting neck portion 22 between balloon portions 23 and 24. As illustrated, especially in Fig. 7, the connecting neck portion 22 is formed of rubber which is considerably thicker than the walls of the balloon portions 23 and 24. This reinforcing ring on the neck 22 allows the balloon to maintain its double shape when inflated and provides a reinforced orifice 25 when the balloon is in telescoped relation shown in Figs. 8 and 9. As shown in Fig. 9 the balloon portion 24 is telescoped within the balloon portion 23 to form a double walled container which is open through the orifice 25. The container illustrated in Fig. 9 is filled with a confection 26, which might be candy or nuts of some kind. A feature of this invention is the relatively small orifice in the telescoped double balloon. This orifice is such that further wrapping of the confection is unnecessary and yet allows the candy or nuts to be conveniently dispensed therefrom. It will be seen, however, that this double walled container could also be used for a frozen confection and that by stretching and rolling back the orifice 25 the confection would be freed from the container either completely or gradually. Since the container is made of flexible soft rubber, which is a moisture repellent material, the container may be easily peeled from the frozen substance.

In all forms of this invention in which a frozen substance is used, the rubber container will act as a relatively good heat insulator and since it is a perfect sanitary seal it will render further paper wrapping unnecessary. In all forms of the invention described above the flexible rubber container may be inflated and used as a toy balloon after the frozen substance is removed. In the form shown in Fig. 6 the balloon portions 23 and 24 might be formed of different colored rubber and thereby be especially useful for certain organized gatherings to represent the colors of the particular organization.

What I claim is:

1. In combination, a confection and a container therefor comprising, an elastic rubber inflatable balloon having its closed end portion telescoped within its open end portion so as to form a double walled container for said confection, and having a relatively small orifice for normally preventing said confection from being inadvertently dispensed and through which said confection may be conveniently dispensed by reason of the elastic characteristics of said container.

2. A new article of manufacture comprising, an elastic rubber inflatable balloon having its closed end portion telescoped within its open end portion so as to form a double-wall container having a relatively small orifice at one end, and, in combination, a congealed edible substance in said container normally retained in said container by reason of said small orifice and adapted to be conveniently dispensed from said container by reason of the elasticity thereof.

3. A new article of manufacture comprising, an elongated elastic rubber cover having an open and a closed end and having its closed end portion telescoped within its open end portion so as to form an elastic double-wall container having a relatively small orifice at one end thereof, and a congealed confection substantially encased by said double-wall container.

4. A new article of manufacture comprising, an inflatable flexible rubber balloon having double body portions, a neck portion joining said body portions, one of said body portions being closed except at the joining neck portion and the other of said body portions having an open neck portion for inflation, said closed body portion being adapted to be telescoped within the open body portion through said joining neck to form a double walled container provided with an opening orifice relatively smaller in diameter than the container, and a confection enclosed in said container, said orifice serving normally to prevent inadvertent dispensing of said confection, said container being distortable to permit enlarging of said orifice whereby said confection may be conveniently dispensed.

5. In combination, a solid congealed edible substance and an inflatable flexible rubber balloon comprising double body portions, and a neck portion joining said body portions, one of said body portions being closed except at its neck portion and the other being provided with an open neck portion for inflation, said closed body portion being adapted to be telescoped within the open body portion through said joining neck to form a double walled container for said congealed substance, said container thereby having a relatively small orifice at one end, said container being adapted to be progressively peeled from the congealed substance without injury to the container by reason of the elasticity of said container.

LLOYD G. COPEMAN.